United States Patent [19]

Cardillo

[11] Patent Number: 5,623,247
[45] Date of Patent: Apr. 22, 1997

[54] MAINTENANCE ALERT CLUSTER

[76] Inventor: Alfredo Cardillo, 16751 Curtis, Roseville, Mich. 48066

[21] Appl. No.: 288,915

[22] Filed: Aug. 11, 1994

[51] Int. Cl.$^6$ .................................................. G08B 19/00
[52] U.S. Cl. .................. 340/457.4; 340/309.15; 340/457; 340/459; 364/424.034
[58] Field of Search ................. 340/457.4, 457, 340/459, 461, 462, 309.15, 438; 364/424.03, 424.01

[56] References Cited

U.S. PATENT DOCUMENTS

| | | | |
|---|---|---|---|
| 1,658,069 | 2/1928 | Wood | 235/144 DM |
| 3,583,629 | 6/1971 | Heidel | 235/96 |
| 3,598,309 | 8/1971 | Engler et al. | 235/95 B |
| 3,935,996 | 2/1976 | Kleinbohl | 235/95 R |
| 4,031,363 | 6/1977 | Freeman et al. | 340/457.4 |
| 4,404,641 | 9/1983 | Bazarnik | 340/457.4 |
| 4,478,521 | 10/1984 | Evans et al. | 340/457.4 |
| 4,593,263 | 6/1986 | Peckworth | 340/457.4 |
| 4,612,623 | 9/1986 | Bazarnik | 340/457.4 |
| 4,884,054 | 11/1989 | Moon, Sr. | 340/457.4 |
| 5,006,829 | 4/1991 | Miyamoto et al. | 340/457.4 |

*Primary Examiner*—Jeffery Hofsass
*Assistant Examiner*—Edward Lefkowitz
*Attorney, Agent, or Firm*—Harness, Dickey & Pierce, P.L.C.

[57] ABSTRACT

A novel electronic device is provided that primarily is connected to a vehicle and programmed to alert its operator as to when to perform preventive maintenance task, such as change engine oil or replace brakes. The device alerts from the actual time the equipment is in use, as opposed to the net forward mileage. The device can either be original equipment or after-market retrofit. The disclosure has secondary uses in heavy-equipment, refrigeration, fire safety, and recreational vehicles.

9 Claims, 2 Drawing Sheets

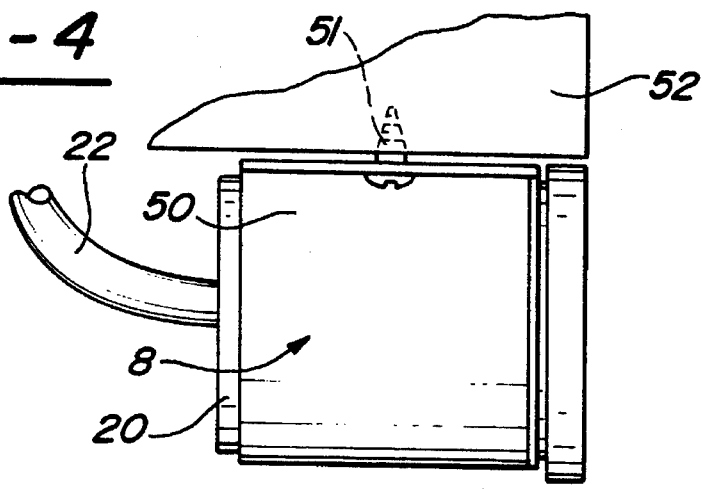
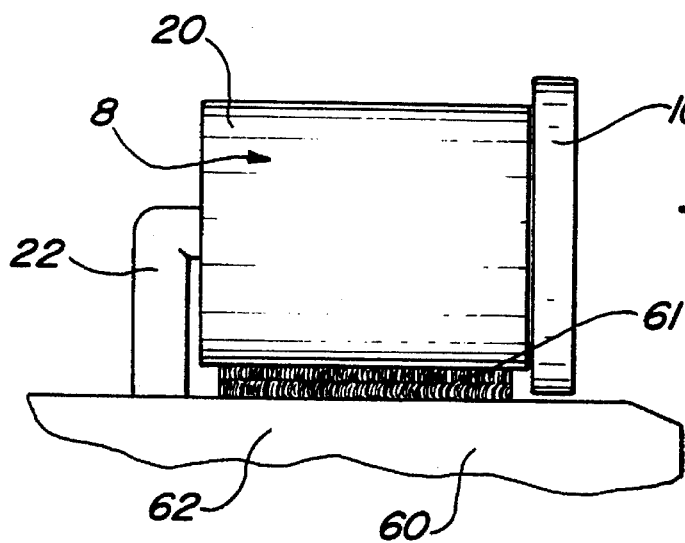
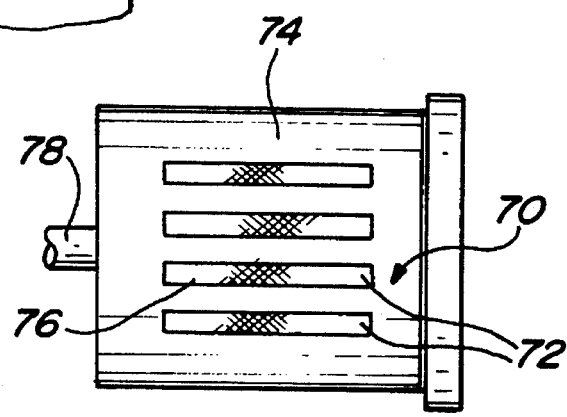

MAINTENANCE ALERT CLUSTER

TECHNICAL FIELD

This invention relates in general to electronic devices used to alert mechanized equipment operators to perform certain preventive and scheduled maintenance task.

BACKGROUND OF THE INVENTION

Most motorized vehicles have monitoring systems for alerting the operator that something has, or is about to go wrong with normal operation of that vehicle. The warning comes either from the visual inspection of gauges, or from flashing lights. Some of the common problems include low oil, engine over heated, battery malfunction, or low brake pressure.

It would be advantageous if the operator had the warnings prior to damage to the vehicle. As no method can predict the future, the best course of action is preventive maintenance. If the operator practiced regular preventive maintenance to the vehicle at hand, the life span of that particular vehicle could be extended indefinitely. Indeed, one could save a major expense by averting costly repairs.

The problem is, when to do what to where. Those skilled in the art would have no problem working out a preventive maintenance schedule. However, the average vehicle owner has difficulty figuring out problems after they have occurred let alone before they happen.

A main object of the present invention therefore is to provide an audio/visual means to alert the operator that it is time to perform a certain preventive maintenance task.

Another object of the present invention is to provide such an alert that can be installed as original equipment or as an aftermarket retro-fit.

Still a further object of the present invention is to provide a preventive maintenance alert which can be installed either in the dash, under the dash, or over the dash.

It is the final object of the present invention to provide such an alert whose signals are based on the complete time the vehicle is running at an idle instead of the vehicle odometer. This would apply to all vehicles that do not have an odometer as original equipment.

SUMMARY OF THE INVENTION

In light of the foregoing problems, and to fulfill the above stated objects, there is provided, according to one aspect of the present invention, a battery of signal lights clustered in a mountable unit which is adaptable to any vehicle, and readily connected to existing wiring harness. The signals emit from a bank of linear face displays, each having a mechanism for setting the desired intervals for performing preventive maintenance on any designated area of a vehicle.

Some of the areas where preventive maintenance is needed include engine oil-rotating the tires-engine tune up-brake system-electrical system-fluid levels and replacement.

The present invention easily installs over, in, or under the dash area of cars, boats, trucks, planes, and heavy equipment as well as all types of recreational vehicles. As the present invention alerts by time and not mileage, the operator will have a more consistent log of wear and tear on the vehicle. To activate the present invention, the electrical leads are connected to the fuse box with the corresponding lead going to ground-to the battery-to the dash lights-and one to the ignition. The lead to the battery prevents the present invention from losing its programming. The lead to the ignition activates the clocking mechanism which sets off the proper signal at the proper time. When the vehicle is off the ignition is off, therefore the clocking is off.

It is foreseen that the present invention could be modified to alert someone to perform preventive maintenance on a number of situations not related to automotive. For example, in a restaurant the proper signal could tell of deep-fry oil needing to be replaced, or grill hood filters needing to be cleaned.

In manufacturing plants the present invention could tell when to service screw machines, presses, and fork lifts. In the home the present invention could tell when to take a medication, or when to check the furnace, or even when to check a smoke detector battery.

By these embodiments, one can see that there is provided a new and useful means for reminding one to perform preventive maintenance task. Accordingly, these and other features will no doubt occur to those skilled in the art upon the study of the detailed description of the preferred embodiments, taken in conjunction with the attached drawings and claims.

BRIEF DESCRIPTION OF THE DRAWINGS

In the drawings where like reference numerals are used to indicate identical components in the various figures:

FIG. 4 is a fragmentary side elevation of the present invention mounted to the underside of a vehicular dash assembly.

FIG. 5 is a fragmentary side elevation of the present invention as using a loop and hook material for semi-fixation to the top surface of a vehicular dash assembly.

FIG. 6 is a side elevation of the present invention depicting the preferred audio method, said method comprising slotted openings for free sound travel.

DETAILED DESCRIPTION OF THE EMBODIMENTS

Figure 1:
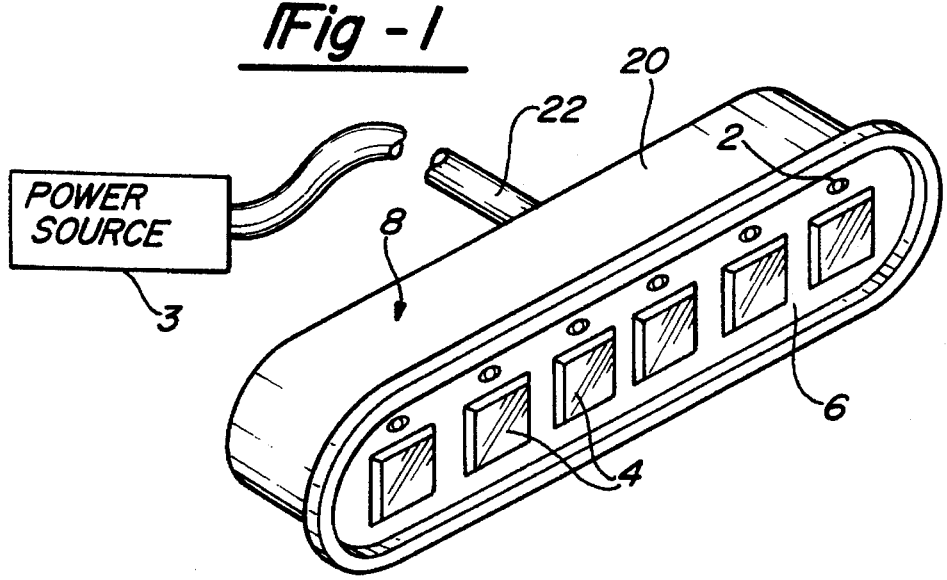
FIG. 1 is a perspective view of the preferred embodiment of the present invention.

With combined reference to all the figures, a maintenance alert cluster is denoted by the numeral 8. As seen in FIG. 1, the maintenance alert cluster 8 comprises a face plate 6 having a plurality of light displays 4. Each light display 4 has a designated set button 2 for entering individual data. Exiting to the rear of the circuit housing 20 is a wiring harness 22 which is inter connected to a direct current or an alternating power source 3.

Figure 2:
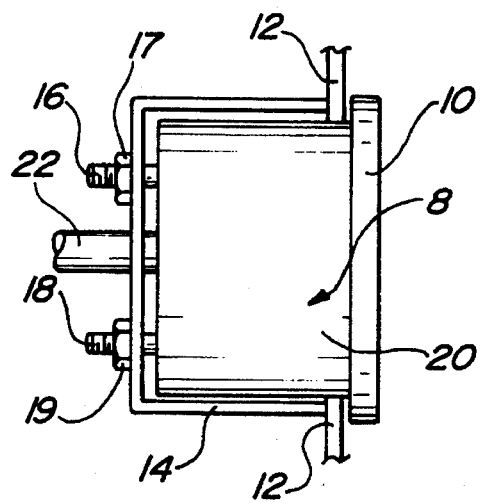
FIG. 2 is a fragmentary side elevation of the present invention as install in a vehicular instrument panel.

FIG. 2 shows the maintenance alert cluster 8 from the side, whereas a dash panel 12 is bound between the face plate rim 10 and a bracket 14, whereas said rim 10 is drawn to said bracket 14 by tightening a first nut 17 onto a first stud 16 and by tightening a second nut 19 onto a second stud 18 until firmly seated against bracket 14. disposed between dash 12 and bracket 14, the circuit housing 20 has a wiring harness 22 extending through said bracket 14 to be connected to a power source.

Figure 3:
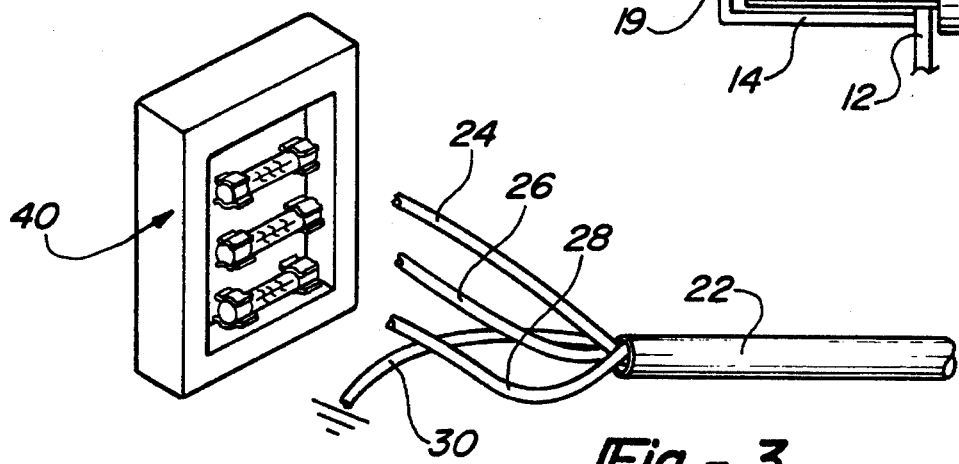
FIG. 3 is a fragmentary perspective view of a common wiring scheme adaptable to the present invention.

FIG. 3 shows the wiring harness 22 baring a first lead 24 designated "ignition", a second lead 26 designated "battery", a third lead 28 designated "dash lights", and a final lead 30 designated as the ground. As seen, a fuse box 40 is adapted for connection to said leads.

FIG. 4 shows the embodiment 8 as mounted to the underside of a dash panel 52 by means of a bracket 50 and a screw 51 thereby binding the circuit housing 20 to the dash panel 52. Extending upward is the wiring harness 22.

FIG. 5 shows the maintenance alert cluster 8 as mounted to the top surface of a dash board 60 by means of a hook 61 and loop 62 fastening system. The hooks 61 are adhered to the underside of the circuit housing 20 while the loops 62 are adhered to the top surface of the dash 60 and combined are of sufficient height for the face plate rim 10 to clear said dash 60. Extending downward through dash 60 is wiring harness 22.

FIG. 6 shows an embodiment 70 having slots 72 extending laterally through the circuit housing 74 for the passage of an audio signal. A dust screen 76 is inter-disposed normal to the audio free area. Extending to a power source, a wiring harness 78 is adapted for communication with a vehicular fuse box.

While the foregoing embodiments of the present invention are well suited to achieve the above stated objects, those skilled in the art should realize that such embodiments are subject to change and modification without departing from the scope of the present invention. For example, the electrical circuitry necessary, but not relied upon, could incorporate a solar cell thereby not limited to a power source.

As another example, the maintenance alert cluster could be adapted to an odometer for preventive alerts based on milage as opposed to real time.

Other variations will no doubt occur to those skilled in the art upon the study of the description and drawings contained herein. Accordingly, it is to be understood that the present invention is not limited to the specific embodiments described herein, but should be deemed to extend to the subject matter defined by the appended claims, including all fair equivalents thereof. Therefore having described my new and useful invention in specific terms, I make the following claims:

I claim:

1. A device for visually alerting an operator to perform at least one preventative maintenance task on a mobile or immobile object in order to extend the life-span thereof, said device comprising:

an elongated face plate member including a series of light displays and a corresponding series of independent data set buttons, each light display of said series of light displays providing a visual indication of a preventative maintenance task to be performed;

programmable means for programming the desired alert time, said programmable means associated with each said data set button and each said light display such that an individual data set button programs only a corresponding dedicated light display such that upon expiration of said desired alert time for the dedicated light display, said light display is activated;

an elongated body shell secured to said face plate and having an interior space for receiving and housing said programmable means through an opening, said opening there sealed off by said face plate;

a wiring harness having a plurality of leads, one of said plurality of leads for connection to a direct current power source for providing power to said programmable means; and means for fixing said device to a surface suitable for providing said operator with a visual alert recognition from said series of light displays.

2. The device of claim 1 wherein said series of light displays extend outwardly from a first surface of said elongated face plate member.

3. The device of claim 1 wherein said means for fixing said device to said surface comprises:

a bracket adapted for communication with at least one stud member and at least one nut member, said at least one stud member extending outwardly normal from a vertical wall surface.

4. The device of claim 1 wherein said means for fixing said device to said surface is a self adhering hook and loop material.

5. The device of claim 1 wherein at least one of said leads of said wiring harness is connectable to an alternating power source.

6. The device of claim 1 further comprising:

audio alert means for providing an audible signal in response to the expiration of said desired alert time.

7. The device of claim 1 wherein said means for fixing said device to said surface comprises:

a bracket adapted for communication with at least one screw member, said at least one screw member extending through at least one aperture in said bracket for communication with said surface.

8. The device of claim 6 wherein the audio alert means includes a speaker mounted within the body shell.

9. The device of claim 1 wherein said at least one preventive maintenance task includes changing engine oil, rotating tires, engine tune-up, brake system maintenance and fluid replacement.

* * * * *

UNITED STATES PATENT AND TRADEMARK OFFICE
CERTIFICATE OF CORRECTION

PATENT NO. : 5,623,247
DATED : April 22, 1997
INVENTOR(S) : Alfredo Cardillo

It is certified that error appears in the above-indentified patent and that said Letters Patent is hereby corrected as shown below:

Title Page, item [57], Abstract, Line 3, "task," should be --tasks,--.

Title Page, item [57], Abstract, Line 8, "heavy-equipment" should be --heavy equipment--.

Column 1, Line 7, "task." should be --tasks.--.

Column 1, Line 35, "retro-fit." should be --retrofit.--.

Column 1, Line 57-59, "oil-rotating the tires-engine tune up-brake system-electrical system-fluid levels" should be --oil, rotating the tires, engine tune-up, brake system, electrical system, fluid levels--.

Column 1, Line 67, "ground-to the battery-to the dash lights-and" should be --ground, to the battery, to the dash lights, and--.

Column 2, Line 19, "task." should be --tasks.--.

Column 2, Line 34, "install" should be --installed--.

Column 2, Line 57, "inter connected" should be --interconnected--.

UNITED STATES PATENT AND TRADEMARK OFFICE
CERTIFICATE OF CORRECTION

PATENT NO. : 5,623,247
DATED : April 22, 1997
INVENTOR(S) : Alfredo Cardillo

It is certified that error appears in the above-indentified patent and that said Letters Patent is hereby corrected as shown below:

Column 2, Line 64, "disposed" should be --Disposed--.

Column 3, Line 44, Delete "I claim:".

Signed and Sealed this

Second Day of September, 1997

Attest:

BRUCE LEHMAN

Attesting Officer

Commissioner of Patents and Trademarks